United States Patent [19]
Aucsmith

[11] Patent Number: 5,754,658
[45] Date of Patent: May 19, 1998

[54] ADAPTIVE ENCRYPTION TO AVOID PROCESSOR OVERSATURATION

[75] Inventor: David Aucsmith, Portland, Oreg.

[73] Assignee: Intel Corporation, Santa Clara, Calif.

[21] Appl. No.: 636,736

[22] Filed: Apr. 19, 1996

[51] Int. Cl.$^6$ .................................................. H04K 1/00
[52] U.S. Cl. .................................... 380/28; 380/49
[58] Field of Search ........................ 380/28, 49, 10

[56] References Cited

U.S. PATENT DOCUMENTS

| | | | |
|---|---|---|---|
| 5,199,069 | 3/1993 | Barrett et al. | 380/28 |
| 5,517,614 | 5/1996 | Tajima et al. | 380/28 |
| 5,530,750 | 6/1996 | Akagiri | 380/28 |

*Primary Examiner*—David C. Cain
*Attorney, Agent, or Firm*—N. Stephan Kinsella, Esq.; William H. Murray, Esq.

[57] ABSTRACT

A method, apparatus, and storage medium for encoding data. According to one embodiment, the data is encrypted with a variable encryption technique, and the encryption is varied to prevent oversaturation of a processor. According to another embodiment, a method, apparatus, and storage medium for decoding data. Encrypted data is received and decrypted, wherein the encrypted data has been generated by encrypting the data with a variable encryption technique, wherein the encryption is varied to prevent oversaturation of a processor.

56 Claims, 5 Drawing Sheets

FIG. 1. ENCODING SYSTEM

FIG. 2. DECODING SYSTEM

300

ADAPTIVE ENCRYPTION TO AVOID PROCESSOR OVERSATURATION

BACKGROUND OF THE INVENTION

1. Field of the Invention

The present invention relates to the encoding and decoding of data, and, in particular, to encryption and decryption of data.

2. Description of the Related Art

This invention relates to signal processing which is often used to encode data signals into an encoded bitstream and to decode such encoded bitstream to reconstruct the original data signals. Such encoded data signals may be video image signals representative of video pictures, or may be other types of data signals such as audio, text, or other types of data. Video pictures may be still images or may be part of a plurality of successive pictures of video signal data that represent a motion video.

As used herein, "picture" and "video picture" may interchangeably refer to signals representative of an image as hereinabove described. Encoding of data is a general term that may encompass encrypting the data signal as well as other operations such as compressing the data signal. Decoding may correspondingly include both decrypting and decompressing a compressed and encrypted data signal. Data encryption is a way of transforming information for the purpose of making the information unintelligible or otherwise unaccessible to unauthorized users, i.e. to all but the intended receiver of the information.

One problem with current encryption techniques lies in the fact that encryption may require a certain amount of processing by the processor, which can cause the processor to oversaturate if the processing capacity that the processor has to devote to the encryption is less than the processor can currently spare. The processing capacity of a processor may be referred to herein as its processing bandwidth, which may be utilized from 0 to 100%. Requiring more than 100% of a processor's bandwidth is problematic, as it may lead to degradation of processor performance, and may be referred to as oversaturation of the processor. A processor utilizing 100% of its processing bandwidth may be considered to be saturated. Thus, an encoder processor can become oversaturated during encryption of data, if other processing performed by the processor plus the encryption processing require more than 100% of the processing bandwidth.

A similar oversaturation problem may occur during decryption by the decoder processor. For example, a decoder processor may require 20% of its processing bandwidth to devote to decrypting a received encoded bitstream (which is, for example, both compressed and encrypted). If the decompression of the bitstream plus other processing of the processor at some point require more than 80% of the processing bandwidth, the decoder processor may become oversaturated.

There is, therefore, a need for improved methods and apparatuses for encrypting and decrypting data signals.

SUMMARY

There is provided herein a method, apparatus, and storage medium for encoding data. According to one embodiment of the invention, the data is encrypted with a variable encryption technique, and the encryption is varied to prevent oversaturation of a processor.

In an alternative preferred embodiment, there is provided herein a method, apparatus, and storage medium for decoding data. According to one embodiment of the invention, encrypted data is received and decrypted, wherein the encrypted data has been generated by encrypting the data with a variable encryption technique, wherein the encryption is varied to prevent oversaturation of a processor.

BRIEF DESCRIPTION OF THE DRAWINGS

These and other features, aspects, and advantages of the present invention will become more fully apparent from the following description, appended claims, and accompanying drawings in which:

DESCRIPTION OF THE PREFERRED EMBODIMENT

The present invention presents a variable encryption technique that is used during encryption of data to prevent the encoder processor and/or the decoder processor from oversaturating. The decoding processor often has only a certain amount of processing bandwidth that may be allocated to decryption, since other processing such as decompression requires some of the processing bandwidth. Thus, in one embodiment, data to be encrypted is encrypted with a variable encryption technique, and the encryption is varied to prevent oversaturation by a processor that will decrypt the encrypted data. In another embodiment, a processor decrypts the data encrypted in accordance with the previously-described technique, thereby avoiding oversaturation.

The encoder processor that encrypts data also often has only a certain amount of processing bandwidth that may be allocated to encryption, since the encoder processor may devote some of its processing bandwidth to other processing such as compression. Thus, in still further embodiments, the encryption is varied to prevent the encoder processor itself from oversaturating.

System Hardware Architectures

Figure 1:
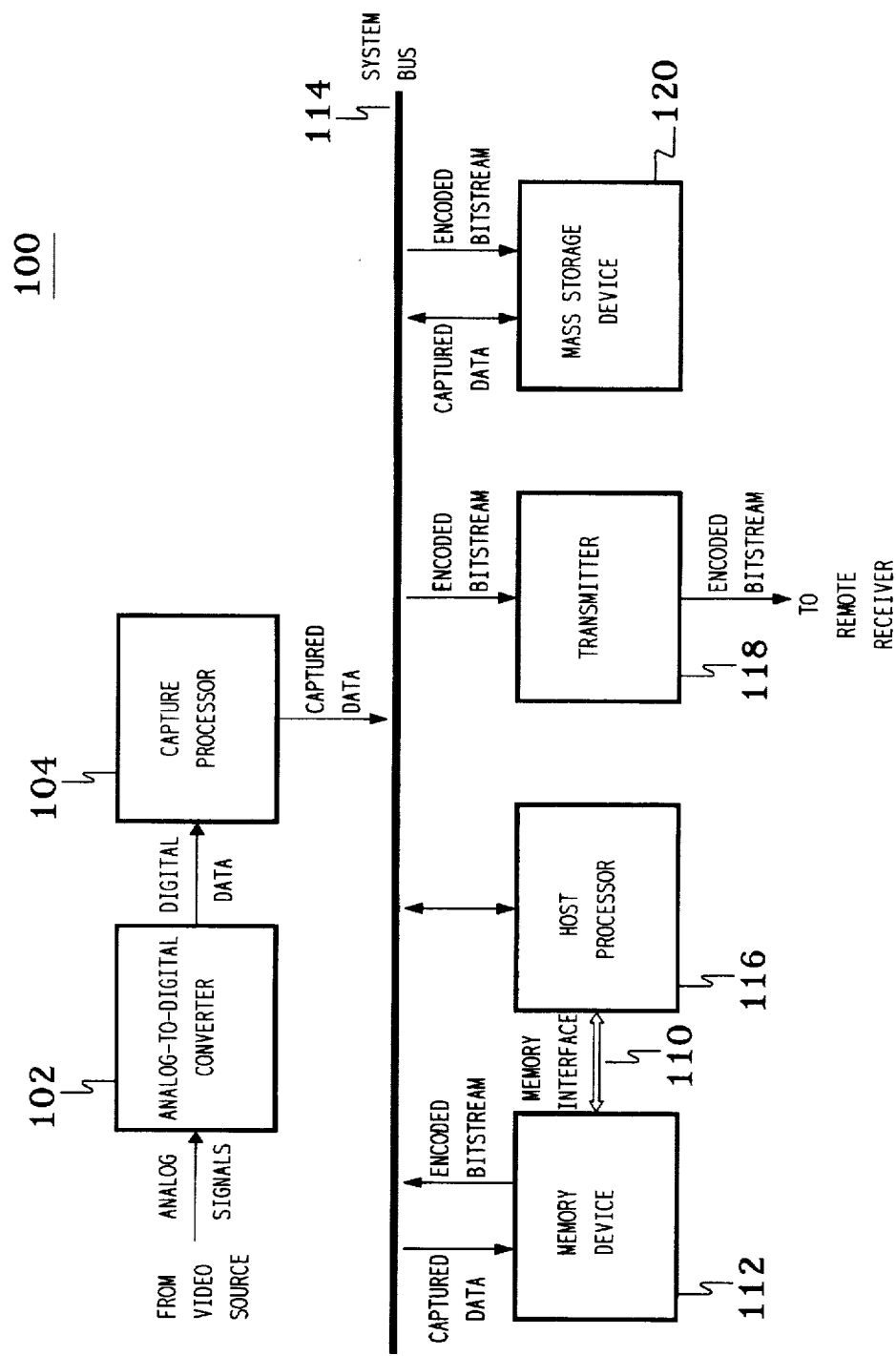
FIG. 1 is a computer-based encoding system for encoding video signals, according to a preferred embodiment of the present invention.

Referring now to FIG. 1, there is shown a computer system 100 for encoding video signals, according to a preferred embodiment of the present invention. Analog-to-digital (A/D) converter 102 of encoding system 100 receives analog video signals from a video source. The video source may be any suitable source of analog video signals such as a video camera or VCR for generating local analog video signals or a video cable or antenna for receiving analog video signals from a remote source. A/D converter 102 separates the analog video signal into constituent components and digitizes the analog components into digital video component data (e.g., in one embodiment, 24-bit RGB component data).

Capture processor 104 captures the digital 3-component video data received from converter 102. Capturing may include one or more color conversion (e.g., RGB to YUV), scaling, and subsampling. Each captured video frame is represented by a set of three two-dimensional component planes, one for each component of the digital video data. In one embodiment, capture processor 104 captures video data in a YUV9 (i.e., YUV 4:1:1) format, in which every (4×4) block of pixels of the Y-component plane corresponds to a single pixel in the U-component plane and a single pixel in the V-component plane.

Capture processor 104 selectively stores the captured data to memory device 112 and/or mass storage device 120 via system bus 114. Those skilled in the art will understand that, for real-time encoding, the captured data are preferably stored to memory device 112, while for non-real-time encoding, the captured data are preferably stored to mass storage device 120. For non-real-time encoding, the captured data will subsequently be retrieved from mass storage device 120 and stored in memory device 112 for encode processing by host processor 116. As will be appreciated, in video conferencing systems (which use on-line, real-time encoding and decoding), each PC system may receive and decode encoded signals received from the PC systems of one or more remote participants to play the decoded video signals locally. In other situations, encoding may be done off-line.

During encoding, host processor 116 reads the captured bitmaps from memory device 112 via high-speed memory interface 110 and generates an encoded video bitstream that represents the captured video data. Depending upon the particular encoding scheme implemented, host processor 116 applies a sequence of compression steps to reduce the amount of data used to represent the information in the video images. Many video compression schemes divide images into blocks of pixels for compression purposes. Host processor 116 also encrypts the data, as described in further detail hereinbelow. The resulting encoded video bitstream is then stored to memory device 112 via memory interface 110. Host processor 116 may copy the encoded video bitstream to mass storage device 120 for future playback and/or transmit the encoded video bitstream to transmitter 118 for real-time transmission to a remote receiver (not shown in FIG. 1).

Figure 2:
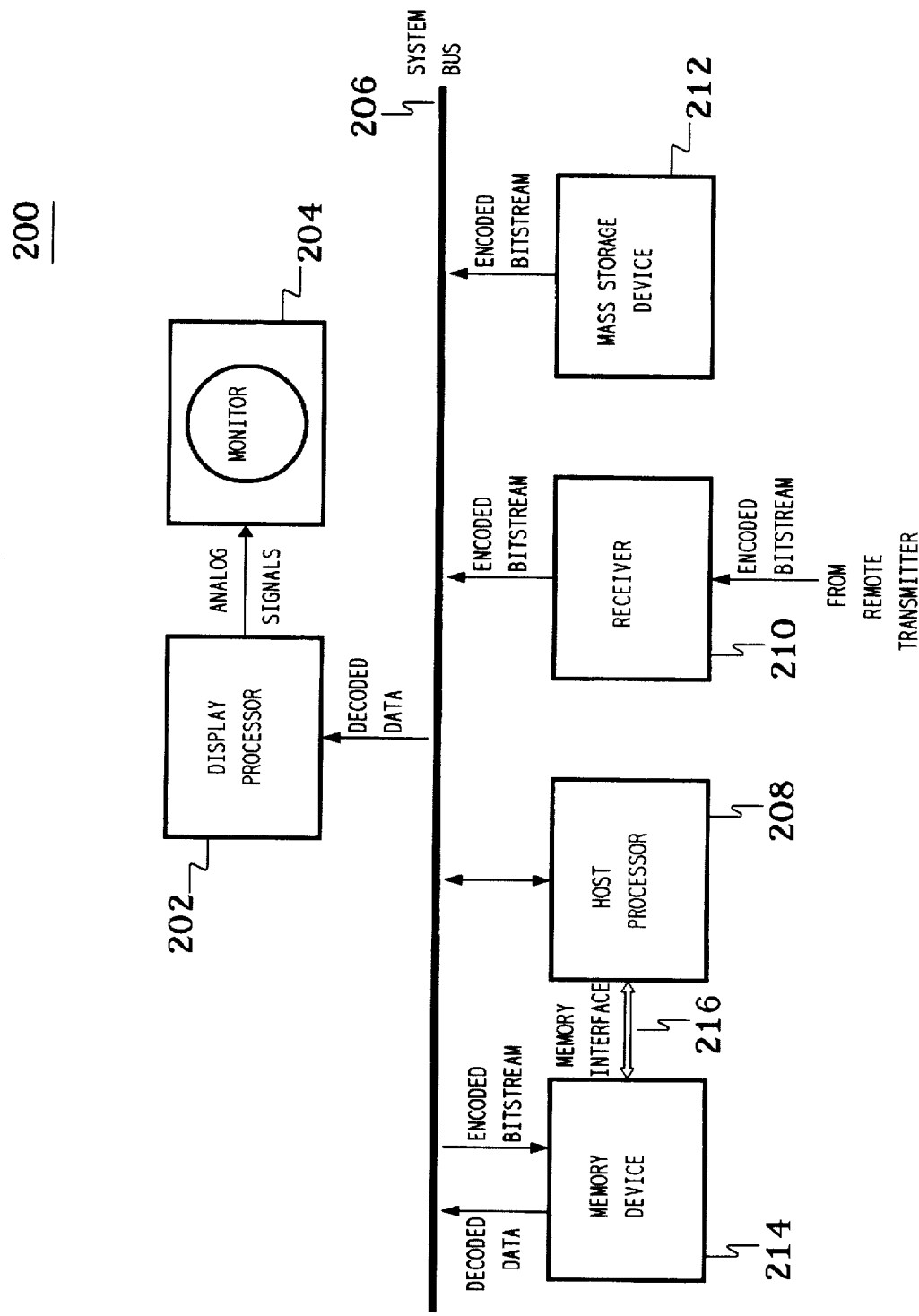
FIG. 2 is a computer-based decoding system for decoding the video signals encoded by the encoding system of FIG. 1, according to a preferred embodiment of the present invention.

Referring now to FIG. 2, there is shown a computer system 200 for decoding the encoded video bitstream encoded by encoding system 100 of FIG. 1, according to a preferred embodiment of the present invention. The encoded video bitstream is either read from mass storage device 212 of decoding system 200 or received by receiver 210 from a remote transmitter, such as transmitter 118 of FIG. 1. The encoded video bitstream is stored to memory device 214 via system bus 206. Decoding system 200 decodes the encoded bitstream, including decrypting, as described in further detail below.

Host processor 208 accesses the encoded video bitstream stored in memory device 214 via high-speed memory interface 216 and decodes the encoded video bitstream for display. Decoding the encoded video bitstream involves undoing the compression and encryption processing implemented by encoding system 100 of FIG. 1. Host processor 208 stores the resulting decoded video data to memory device 214 via memory interface 216 from where the decoded video data are transmitted to display processor 202 via system bus 206. Alternatively, host processor 208 transmits the decoded video data directly to display processor 202 via system bus 206. Display processor 202 processes the decoded video data for display on monitor 204. The processing of display processor 202 includes digital-to-analog conversion of the decoded video data. After being decoded by host processor 208 but before being D/A converted by display processor 202, the decoded video data may be upsampled (e.g., from YUV9 to YUV24), scaled, and/or color converted (e.g., from YUV24 to RGB24). Depending upon the particular embodiment, each of these processing steps may be implemented by either host processor 208 or display processor 202.

Referring again to FIG. 1, encoding system 100 is preferably a microprocessor-based personal computer (PC) system with a special purpose video-processing plug-in board. In particular, A/D converter 102 may be any suitable means for decoding and digitizing analog video signals. Capture processor 104 may be any suitable processor for capturing digital video component data as subsampled frames. In a preferred embodiment, A/D converter 102 and capture processor 104 are contained in a single plug-in board capable of being added to a microprocessor-based PC system.

Host processor 116 may be any suitable means for controlling the operations of the special-purpose video processing board and for performing video encoding. Host processor 116 is preferably a general-purpose microprocessor manufactured by Intel Corporation, such as an i486™, Pentium®, or Pentium® Pro processor. System bus 114 may be any suitable digital signal transfer device and is preferably a peripheral component interconnect (PCI) bus. Memory device 112 may be any suitable computer memory device and is preferably one or more dynamic random access memory (DRAM) devices. High-speed memory interface 110 may be any suitable means for interfacing between memory device 112 and host processor 116. Mass storage device 120 may be any suitable means for storing digital data and is preferably a computer hard drive. Transmitter 118 may be any suitable means for transmitting digital data to a remote receiver. Those skilled in the art will understand that the encoded video bitstream may be transmitted using any suitable means of transmission such as telephone line, RF antenna, local area network, or wide area network.

Referring again to FIG. 2, decoding system 200 is preferably a microprocessor-based PC system similar to the basic PC system of encoding system 100. In particular, host processor 208 may be any suitable means for decoding an encoded video bitstream and is preferably a general purpose microprocessor manufactured by Intel Corporation, such as an i486™, Pentium®, or Pentium® Pro processor. System bus 206 may be any suitable digital data transfer device and is preferably a PCI bus. Mass storage device 212 may be any suitable means for storing digital data and is preferably a CD-ROM device or a hard drive. Receiver 210 may be any suitable means for receiving the digital data transmitted by transmitter 118 of encoding system 100. Display processor 202 and monitor 204 may be any suitable devices for processing and displaying video images (including the conversion of digital video data to analog video signals) and are preferably parts of a PC-based display system having a PCI graphics board and a 24-bit RGB monitor.

In a preferred embodiment, encoding system 100 of FIG. 1 and decoding system 200 of FIG. 2 are two distinct computer systems. In an alternative preferred embodiment of the present invention, a single computer system comprising all of the different components of systems 100 and 200 may be used to encode and decode video images. Those skilled in the art will understand that such a combined system may be used to display decoded video images in real-time to monitor the capture and encoding of video stream.

In alternative embodiments of present invention, the video encode processing of an encoding system and/or the video decode processing of a decoding system may be assisted by a pixel processor or other suitable component(s) to off-load processing from the host processor by performing computationally intensive operations.

Adaptive Encryption

In the present invention, encoding system 100 varies the degree and/or type of encryption with which the data is encrypted to avoid oversaturation of host processor 116 of encoding system 100 and/or to avoid oversaturation of host processor 208 of decoding system 200, as described in further detail below. As described hereinabove, encoding may include encryption, compression, and other types of encoding, while decoding may include decompression, decryption, and other types of decoding. It is possible for an encryption process of the present invention also to compress data as part of the encryption process.

Figure 3:
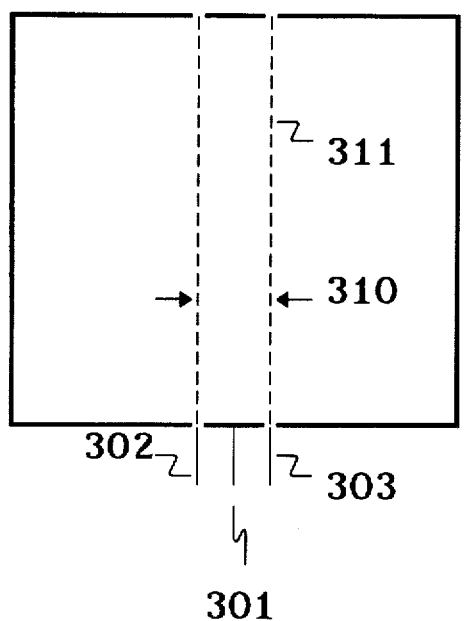
FIG. 3 is video picture encrypted with a vertical-band encryption technique in accordance with the encoding system of FIG. 1.

As will be appreciated, a given type of encryption may be varied depending on the nature of the encryption, to require less processing bandwidth at the expense of a lower degree of encryption protection. For example, one encryption technique for encrypting a data signal representing a video picture having an array of pixels is to encrypt a vertical band of pixels centered horizontally on the image. Referring now to FIG. 3, there is shown a video picture 300 encrypted with a vertical-band encryption technique in accordance with encoding system 100 of FIG. 1. Video picture 300 comprises a vertical band 311 of encrypted pixels, centered about center line 301. Band 311 extends between vertical lines 302, 303, and has width 310.

For full encryption, the width 310 of the band could equal the width of the picture, i.e. each pixel of video picture 300 is encrypted. Thus, an unauthorized user trying to decode and view the picture would be unable to decrypt and thus view the pixels. This full encryption requires a certain amount of processing bandwidth of the decoding processor (host processor 208 of decoding system 200) during decryption, as will be appreciated. However, a vertical band 311 of smaller width 310, for example 20% of the picture width, requires a correspondingly smaller processing bandwidth for decryption yet still performs useful encryption functions, since having a substantial vertical band of un-decryptable pixels causes annoying artifacts for the unauthorized viewer. Such an encryption technique is thus a variable encryption technique that allows the degree of encryption to be varied to vary the processing bandwidth necessary to decrypt the encrypted data.

As will be understood, various encryption techniques may be utilized to encrypt pixels or columns of vertical band 311. For example, a single pseudo-random number may be generated for each video picture to be encrypted, with the next pseudo-random number in the sequence used for the next video picture, and so on. The random number generated for each picture may be used as an encryption key which is used to "smudge" various pixels by XORing each pixel's value with the encryption key.

Encoding system 100 may also transmit to decoding system 200 information about which pixels were "smudged," and, just as encoding system 100 advances the sequence for every picture, decoding system 200 determines the relevant pseudo-random numbers of the sequence by also incrementing to the next number of the sequence. For example, encoding system 100 may have time to encrypt a vertical band comprising 10 columns of pixels, by XORing each pixel of the vertical band with the same encryption key, before it must halt encryption to avoid oversaturating decoding system 200. In this case, for example, a number indicating the width, in columns, of vertical band 311, may be transmitted to decoding system to allow it to undo the smudging of pixels in the vertical band.

Alternatively, each column of even each pixel of vertical band 311 may be encrypted with a different pseudo-random number. In this case a new pseudo-random number is generated for each new column encrypted and decrypted. In further alternative embodiments, each pixel may be encrypted with a unique pseudo-random number.

In general, such a variable encryption technique may involve varying a region of pixels having a variable size. Thus, in alternative preferred embodiments, the region may comprise a horizontal band having a variable width, or another type of region the size of which may be varied. As will be further appreciated by those skilled in the art, various cryptographic techniques may be utilized to synchronize encoding and decoding system 100, 200 with respect to the pseudo-random number generator, e.g. some secure transmission of the initial seed from encoding system 100 to decoding system 200 may occur. Once decoding system 200 has the initial seed, it may increment the pseudo-random number sequence to determine each subsequent pseudo-random number, which are the same as those used by encoding system 100 in encryption. Unauthorized users will not have the initial seed or may not even know the type of encryption method used, and thus will be unable to decrypt encrypted data. As will be appreciated, in alternative preferred embodiments any suitable cryptographic technique may be utilized in this regard.

Thus, in one embodiment, during encoding of a data signal encoding system 100 adapts the amount of encryption applied to the data so that host processor 208 of decoding system 200 will not oversaturate when decrypting the data. As will be understood, in the present invention the encryption used is thus dynamically modified during encoding based on processing bandwidth that is expected to be available for decrypting on host processor 208.

In order for encoding system 100 to encrypt data such that decoding system 200 will not oversaturate due to decrypting, encoding system 100 estimates the likely amount of processing bandwidth that will be required by host processor 208 of decoding system in decoding the data, that is, in both decompressing and decrypting the data. In this method, a variable encrypting technique as described above is utilized by encoding system 100 so that the amount of encryption may be varied to adapt to the predicted processing bandwidth utilization of host processor 208. In a preferred embodiment, the estimate is performed by encoding system 100 while encrypting the data.

As will be understood, various techniques may be utilized by encoding system 100 to model the likely processing bandwidth utilized by host processor 208 during decoding. In one embodiment, the technique of "Markovian chains" may be utilized by host processor 116 to build a statistical model of host processor 208's decoding processing to estimate the processing bandwidth required by host processor 208 to decrypt and decompress (i.e., decode) the data. In another embodiment, a more "brute force" method may be used, in which host processor 116 actually simulates the processing of host processor 208's decoding, if this is practicable; or in which a duplicate or representative processor similar to host processor 208 is used to decode encoded video on the encoding side during encoding to assist in predicting the processing bandwidth that host processor 208 will use in decoding.

In an alternative embodiment, during encoding of a data signal encoding system 100 adapts the amount of encryption applied to the data so that host processor 116 of encoding system 100 will not oversaturate while encrypting the data.

In further embodiments encoding system 100 may adapt the encryption to ensure that neither host processor 116 (during encoding) nor host processor 208 (during decoding) will become oversaturated. As will be understood, however, encoding may often be performed off-line in non-real-time to perform more computation-intensive and more efficient encoding. In this case often only the decoding side will cause an oversaturation problem, and thus data encryption may be varied only to prevent host processor 208 oversaturation. For example, a video sequence or movie may be compressed and encrypted (off-line, in non-real-time) and stored on a digital video disk by a system such as encoding system 100. The data is compressed for efficiency in storage and other reasons, and is encrypted to reduce the likelihood of access to the video data by unauthorized users. The video data stored on the disk may be intended to be played back in real-time by decoding system 200, and thus it is desirable that decoding system 200 be able to decompress and decrypt the data stored thereon in real-time without oversaturating its host processor 208.

Various types of data encryption may be utilized by encoding system 100 that allow the amount of encryption to be varied to increase or decrease the processing bandwidth required during decryption. In one embodiment, an encryption technique utilizing an encrypted vertical band 311, as described above, may be employed, in which the width of the band may be varied during encryption. The data to be encrypted may already, for example, have been compressed or partially compressed. As will be appreciated, such encryption could begin by encrypting the center vertical column of pixels, followed by successive encryption of adjacent pixel columns, so that the longer the encryption proceeds, the wider encrypted band 311 and thus the greater the degree of encryption protection afforded and also the greater the processing bandwidth that is required for both encryption and decryption. Thus, during such encryption of a given video frame or picture, encoding system 100 could continue to widen encrypted band 311 by encrypting further adjacent columns until it is determined that any more encryption would cause oversaturation of host processor 208 during its decryption processing. At that point the encryption could halt and the video data, which has been encrypted to a certain degree, could be transmitted to decoding system 200.

As will be appreciated, during encryption, periodic calls may be made by the encrypting application to an estimation application that estimates the processing bandwidth on the decoding side that will be used for decryption. When it is determined via one of these calls that no remaining encryption could be decrypted without host processor 208 oversaturation, the encryption may be stopped as soon as practicable. As will also be understood, similar calls may be made to determine if encoding system 100 itself is close to oversaturation to stop encryption to prevent oversaturation of host processor 116.

In another embodiment, a tile- or block-swapping technique may be utilized. In this technique, pairs or other combinations of blocks of the video picture being encoded are swapped. For example, in a picture having approximately 10,000 blocks (numbered from 1 to 10,000), the encryption method may switch, randomly, blocks 1 and 53; 2 and 783; and so on. As will be understood, this block-swapping technique may be performed on a raw video image which is broken up into blocks, or on other blocks of a video picture that result from compression or other processing. Thus, for example, the block-swapping may be performed after compression has provided DCT blocks, but before the blocks are run-length encoded. A pseudo-random number generator may be used, as described above, to generate keys used to determine which pairs of blocks to swap. Before transmitting the run-length encoded blocks, which have been partially swapped, to decoding system 200, encoding system 100 may transmit swap information to decoding system 200 to inform the decoding system of how to re-order the blocks into their original position.

Thus, for example, suppose that blocks 1 and 53; 2 and 783 are pseudo-randomly swapped. This may be done, for example, by encoding system 100 simply starting with block 1 and swapping it with a pseudo-randomly chosen block, followed by the same step applied to block 2, then block 3, and so on. This may continue until such swapping-type encryption must be halted to prevent processor oversaturation. Thus, after a certain amount of encryption, a given group of blocks, such as blocks 1-N, may have been swapped at random with other blocks, in accordance with the first N pseudo-random numbers of a particular sequence. Thus, before the transmission of block 1, a "start encryption" flag may be transmitted, followed by blocks 1-N, and then finally followed by a "stop encryption" flag. Decoding system 200 may detect these flags by scanning for such flags, and may use this information to appropriately re-order the encrypted blocks, for example by incrementing a duplicate pseudo-random number generator for each encrypted/swapped block, and swapping it in accordance with the pseudo-random number for that block.

Without the ability of decoding system 200 to decrypt the blocks encrypted in this manner, each video picture decoded will contain severe artifacts since various blocks are misplaced. With only a single pair of blocks swapped, the level of encryption is relatively low, since the artifact caused thereby is relatively invisible and also relatively easy to automatically detect and repair. As more pairs or other combinations of blocks are swapped, however, the level of encryption is increasingly higher. Correspondingly, the processing bandwidth required in decryption is lower or higher in accordance with the number and complexity of block swaps. During such swapping-type encryption of a given video frame or picture, encoding system 100 could continue to swap various pairs of blocks until it is determined that any more swaps would cause oversaturation of host processor 208. At that point the swapping could cease and the compressed video data, which has been encrypted to a certain degree, could be transmitted to decoding system 200.

As will be appreciated by those skilled in the art, other types of variable encryption may be used for video data or for other types of data, such as audio, text, or other forms of data.

As will also be understood, when using various types of variable encryption, different techniques may be utilized to ensure synchronization between encoding and decoding systems, such as synchronization of a seed value for a pseudo-random number generator as described above. In some encryption techniques in which encryption is embedded with data, a decoding system 200 may not need to be specially notified that varying amounts of encryption are used, if it is able to detect whenever data is encrypted and to decrypt any encryption utilized. In other techniques, however, various cryptographic variables may be transmitted by encoding system 100 to decoding system 200 along with certain sets of data to inform decoding system 200 of what type of data encryption is used, how it varies, how its varying degrees of encryption ought to be detected and decrypted, and the like.

Figure 4:
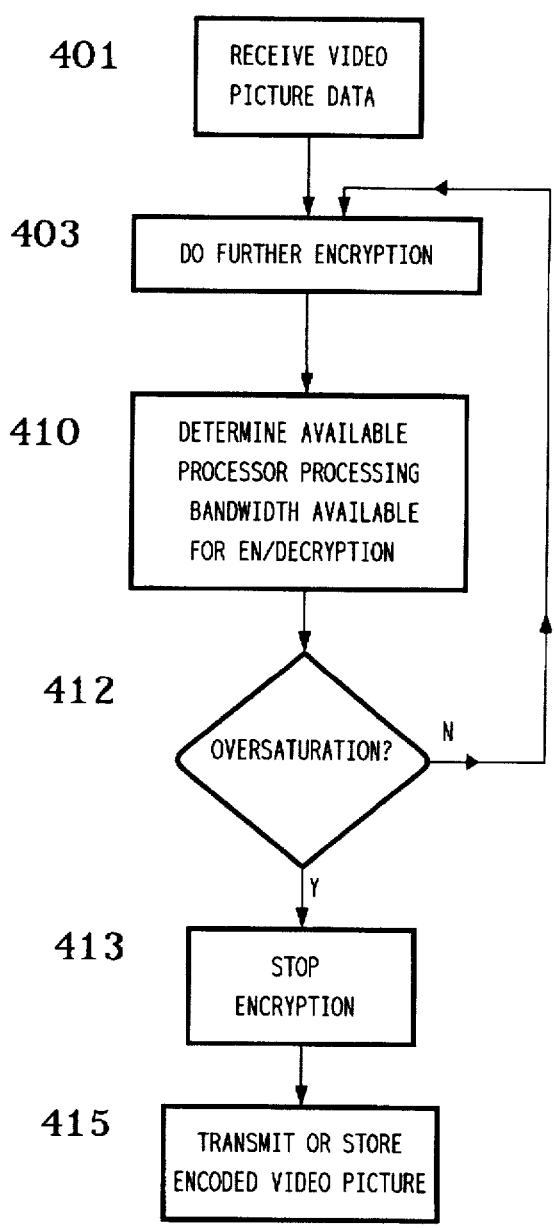
FIG. 4 is a flow chart of the method of operation of the encoding system of FIG. 1.

Referring now to FIG. 4, there is shown a flow chart 400 of a method of operation of encoding system 100 of FIG. 1, in accordance with the present invention. Flow chart 400 illustrates the steps described hereinabove with respect to the block-swapping encryption technique example used for encrypting video pictures. First, host processor 116 receives a frame or picture of video data to encode or otherwise process (step 401 of FIG. 4). As will be understood, before encrypting the video data, the frame may be divided into a plurality of blocks. These blocks may be have been transformed using the forward DCT.

Next, host processor 116 begins encryption of the video signals (step 403). This encryption may comprise swapping pairs of blocks in a pseudo-random fashion, as described above. A group of N pairs of blocks may be swapped (step 403) before making a call to the appropriate application or applet that estimates whether host processor 208 is in danger of becoming oversaturated during decryption if any more encryption is performed (step 410). If so, encryption is halted (steps 412, 413). If not, then further encryption is performed by performing block swapping on additional pairs of blocks (steps 412, 403). Once encryption stops (step 413), the encrypted video picture may be further encoded to generate an encrypted, compressed bitstream that may be stored or transmitted to decoding system 200 (step 415).

As will be appreciated, step 403 may also comprise other encryption techniques such as the vertical band technique described above. Thus, during performance of step 403 for each iteration of the loop from steps 403–412, another group of columns of pixels may be encrypted to extend the width of vertical band 311. Additionally, in alternative preferred embodiments in step 410 a call may be made to determine whether host processor 116 of encoding system 100 itself has processing bandwidth available for encryption, to prevent host processor 116 from oversaturating during encryption.

Figure 5:
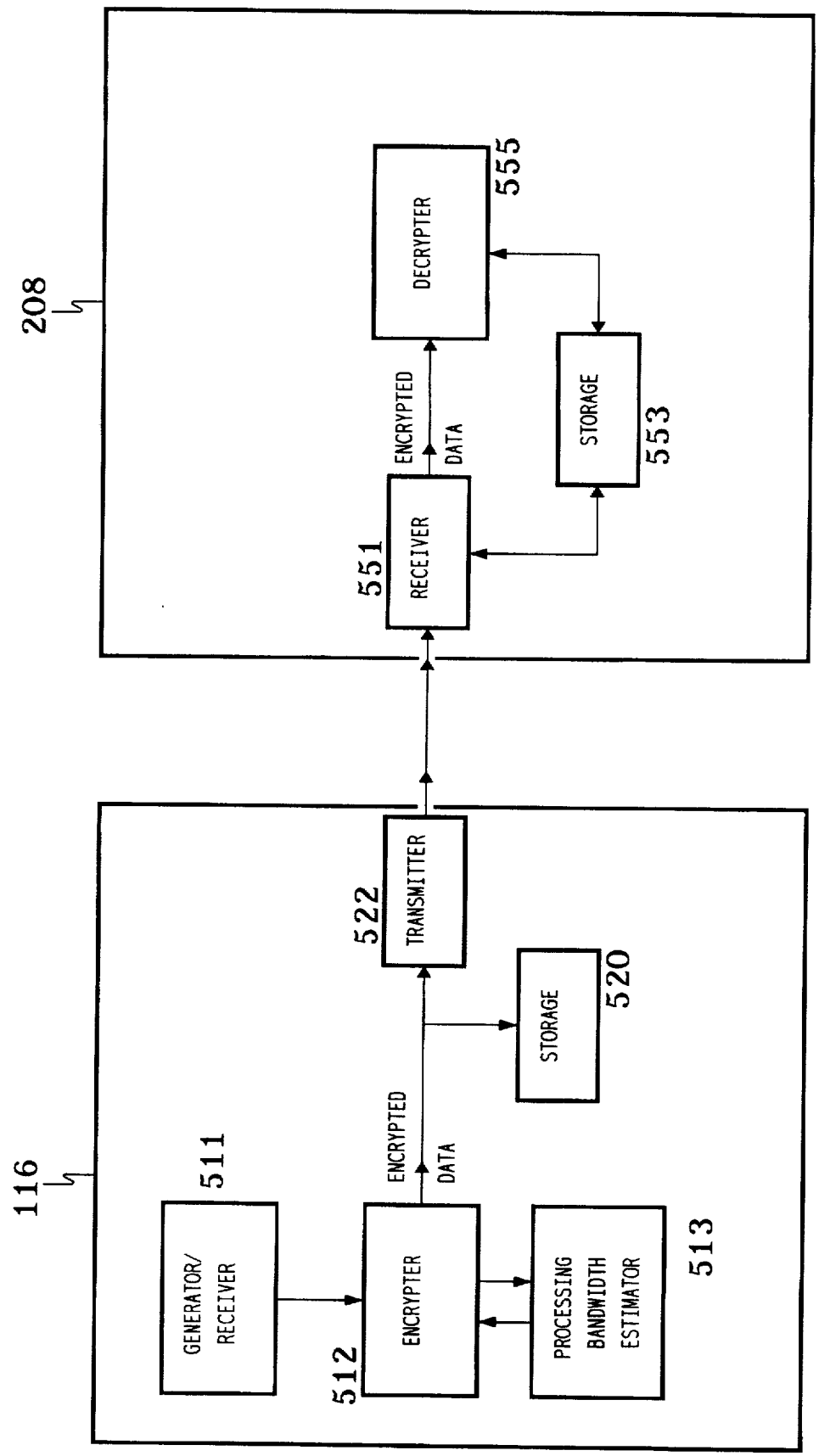
FIG. 5 is a block diagram of functional components illustrating the operation of the host processors of the encoding system of FIG. 1 and the decoding system of FIG. 2.

Referring now to FIG. 5, there is shown a block diagram of functional components illustrating the operation of host processor 116 of encoding system 100 of FIG. 1 and host processor 208 of decoding system 200 of FIG. 2. Thus, corresponding to the functions performed by the steps of flowchart 400 of FIG. 4, host processor 116 comprises generator/receiver 511 which provides data to be encrypted to encrypter 512. Encrypter determines when to stop encrypting or how to otherwise vary the encryption, by using processing bandwidth estimator 513, as described above with respect to steps 410, 412. The encrypted data output by encrypter 512 may be stored in storage 520 or transmitted to host processor 208 of decoding system 200 by transmitter 522. Such transmitted encrypted data is received by receiver 551 of host processor 208, and may be either stored in storage 553 or communicated to decrypter 555. Decrypter 555 may receive encrypted data to be decrypted either from receiver 551 or from storage 553, as illustrated.

As will be understood, the present invention can be embodied in the form of computer-implemented processes and apparatuses for practicing those processes. The present invention can also be embodied in the form of computer program code embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A method for encoding data, the method comprising the steps of:
   (a) providing data; and
   (b) encrypting the data with a variable encryption technique, wherein the encryption is varied to prevent oversaturation of a processor.

2. The method of claim 1, wherein step (b) comprises the steps of:
   (1) determining an available processing bandwidth of the processor that is available to encrypt the data; and
   (2) varying the encryption so that the processor uses no more than the available processing bandwidth during encryption of the data.

3. The method of claim 1, wherein step (b) comprises the steps of:
   (1) estimating an available processing bandwidth of the processor that is available to decrypt the encrypted data; and
   (2) varying the encryption so that the processor uses no more than the available processing bandwidth during decryption of the encrypted data.

4. The method of claim 3, wherein the estimating of step (b)(1) utilizes Markovian chains to model probable processing by the processor.

5. The method of claim 3, wherein step (b)(2) comprises the step of halting the encryption if further encrypting would cause oversaturation of the processor during decryption of the encrypted data.

6. The method of claim 1, wherein:
   the data comprises a video picture; and
   step (b) comprises encrypting a region of pixels having a variable size.

7. The method of claim 1, wherein:
   the data comprises a video picture having a plurality of blocks; and
   step (b) comprises swapping pairs of the blocks.

8. An apparatus for encoding data, comprising:
   (a) means for providing data; and
   (b) means for encrypting the data with a variable encryption technique, wherein the encryption is varied to prevent oversaturation of a processor.

9. The apparatus of claim 8, wherein means (b):
   (1) determines an available processing bandwidth of the processor that is available to encrypt the data; and (2) varies the encryption so that the processor uses no more than the available processing bandwidth during encryption of the data.

10. The apparatus of claim 8, wherein means (b):

(1) estimates an available processing bandwidth of the processor that is available to decrypt the encrypted data; and (2) varies the encryption so that the processor uses no more than the available processing bandwidth during decryption of the encrypted data.

11. The apparatus of claim 10, wherein means (b) utilizes Markovian chains to model probable processing by the processor.

12. The apparatus of claim 10, wherein means (b) halts the encryption if further encrypting would cause oversaturation of the processor during decryption of the encrypted data.

13. The apparatus of claim 8, wherein:

the data comprises a video picture; and means (b) encrypts a region of pixels having a variable size.

14. The apparatus of claim 8, wherein:

the data comprises a video picture having a plurality of blocks; and means (b) swaps pairs of the blocks.

15. A storage medium having stored thereon a plurality of instructions for encoding data, wherein the plurality of instructions, when executed by a processor of a computer, cause the processor to perform the steps of:

(a) providing the data; and (b) encrypting the data with a variable encryption technique, wherein the encryption is varied to prevent oversaturation of a processor.

16. The storage medium of claim 15, wherein step (b) comprises the steps of:

(1) determining an available processing bandwidth of the processor that is available to encrypt the data; and (2) varying the encryption so that the processor uses no more than the available processing bandwidth during encryption of the data.

17. The storage medium of claim 15, wherein step (b) comprises the steps of:

(1) estimating an available processing bandwidth of the processor that is available to decrypt the encrypted data; and (2) varying the encryption so that the processor uses no more than the available processing bandwidth during decryption of the encrypted data.

18. The storage medium of claim 17, wherein step (b)(1) utilizes Markovian chains to model probable processing by the processor.

19. The storage medium of claim 17, wherein step (b)(2) comprises the step of halting the encryption if further encrypting would cause oversaturation of the processor during decryption of the encrypted data.

20. The storage medium of claim 15, wherein:

the data comprises a video picture; and step (b) comprises the step of encrypting a region of pixels having a variable size.

21. The storage medium of claim 15, wherein:

the data comprises a video picture having a plurality of blocks; and step (b) comprises the step of swapping pairs of the blocks.

22. An apparatus for encoding data, comprising:

(a) an encrypter; and (b) a data generator; wherein:

the data generator supplies data to the encrypter;

the encrypter encrypts the data with a variable encryption technique, wherein the encryption is varied to prevent processor oversaturation.

23. The apparatus of claim 22, wherein the encryption is varied by:

(1) estimating an available processing bandwidth of a processor that is available to encrypt the data; and (2) varying the encryption so that the processor uses no more than the available processing bandwidth during encryption of the data.

24. The apparatus of claim 22, wherein the encryption is varied by:

(1) estimating an available processing bandwidth of the second processor that is available to decrypt the encrypted data; and (2) varying the encryption so that the second processor uses no more than the available processing bandwidth during decryption of the encrypted data.

25. The apparatus of claim 24, wherein the estimating utilizes Markovian chains to model probable processing by the second processor.

26. The apparatus of claim 24, wherein the varying comprises halting the encryption if further encrypting would cause oversaturation of the second processor during decryption of the encrypted data.

27. The apparatus of claim 22, wherein:

the data comprises a video picture; and the encrypting comprises encrypting a region of pixels having a variable size.

28. The apparatus of claim 22, wherein:

the data comprises a video picture having a plurality of blocks; and the encrypting comprises swapping pairs of the blocks.

29. A method for decoding data, the method comprising the steps of:

(1) receiving encrypted data; and (2) decrypting the encrypted data, wherein the encrypted data has been generated by:

(a) providing data; and (b) encrypting the data with a variable encryption technique, wherein the encryption is varied to prevent oversaturation of a processor.

30. The method of claim 29, wherein step (b) comprises the steps of:

(1) determining an available processing bandwidth of the processor that is available to encrypt the data; and (2) varying the encryption so that the processor uses no more than the available processing bandwidth during encryption of the data.

31. The method of claim 29, wherein step (b) comprises the steps of:

(1) estimating an available processing bandwidth of the processor that is available to decrypt the encrypted data; and (2) varying the encryption so that the processor uses no more than the available processing bandwidth during decryption of the encrypted data.

32. The method of claim 31, wherein the estimating of step (b)(1) utilizes Markovian chains to model probable processing by the processor.

33. The method of claim 31, wherein step (b)(2) comprises the step of halting the encryption if further encrypting would cause oversaturation of the processor during decryption of the encrypted data.

34. The method of claim 29, wherein:
the data comprises a video picture; and
step (b) comprises encrypting a region of pixels having a variable size.

35. The method of claim 29, wherein:
the data comprises a video picture having a plurality of blocks; and
step (b) comprises swapping pairs of the blocks.

36. An apparatus for decoding data, comprising:
(1) means for receiving encrypted data; and
(2) means for decrypting the encrypted data, wherein the encrypted data has been generated by:
(a) providing data; and
(b) encrypting the data with a variable encryption technique, wherein the encryption is varied to prevent oversaturation of a processor.

37. The apparatus of claim 36, wherein step (b) comprises the steps of:
(1) determining an available processing bandwidth of the processor that is available to encrypt the data; and
(2) varying the encryption so that the processor uses no more than the available processing bandwidth during encryption of the data.

38. The apparatus of claim 36, wherein step (b) comprises the steps of:
(1) estimating an available processing bandwidth of the processor that is available to decrypt the encrypted data; and
(2) varying the encryption so that the processor uses no more than the available processing bandwidth during decryption of the encrypted data.

39. The apparatus of claim 38, wherein the estimating of step (b)(1) utilizes Markovian chains to model probable processing by the processor.

40. The apparatus of claim 38, wherein step (b)(2) comprises the step of halting the encryption if further encrypting would cause oversaturation of the processor during decryption of the encrypted data.

41. The apparatus of claim 36, wherein:
the data comprises a video picture; and
step (b) comprises encrypting a region of pixels having a variable size.

42. The apparatus of claim 36, wherein:
the data comprises a video picture having a plurality of blocks; and
step (b) comprises swapping pairs of the blocks.

43. A storage medium having stored thereon a plurality of instructions for decoding data, wherein the plurality of instructions when executed by a processor of a computer, cause the processor to perform the steps of:
(1) receiving encrypted data; and
(2) decrypting the encrypted data, wherein the encrypted data has been generated by:
(a) providing data; and
(b) encrypting the data with a variable encryption technique, wherein the encryption is varied to prevent oversaturation of a processor.

44. The storage medium of claim 43, wherein step (b) comprises the steps of:
(1) determining an available processing bandwidth of the processor that is available to encrypt the data; and
(2) varying the encryption so that the processor uses no more than the available processing bandwidth during encryption of the data.

45. The storage medium of claim 43, wherein step (b) comprises the steps of:
(1) estimating an available processing bandwidth of the processor that is available to decrypt the encrypted data; and
(2) varying the encryption so that the processor uses no more than the available processing bandwidth during decryption of the encrypted data.

46. The storage medium of claim 45, wherein the estimating of step (b)(1) utilizes Markovian chains to model probable processing by the processor.

47. The storage medium of claim 45, wherein step (b)(2) comprises the step of halting the encryption if further encrypting would cause oversaturation of the processor during decryption of the encrypted data.

48. The storage medium of claim 43, wherein:
the data comprises a video picture; and
step (b) comprises encrypting a region of pixels having a variable size.

49. The storage medium of claim 43, wherein:
the data comprises a video picture having a plurality of blocks; and
step (b) comprises swapping pairs of the blocks.

50. An apparatus for encoding data, comprising:
(1) a receiver; and
(2) a decrypter; wherein:
the receiver receives encrypted data;
the decrypter decrypts the encrypted data; and
the encrypted data has been generated by:
(a) providing data; and
(b) encrypting the data with a variable encryption technique, wherein the encryption is varied to prevent oversaturation of a processor.

51. The apparatus of claim 50, wherein step (b) comprises the steps of:
(1) determining an available processing bandwidth of the processor that is available to encrypt the data; and
(2) varying the encryption so that the processor uses no more than the available processing bandwidth during encryption of the data.

52. The apparatus of claim 50, wherein step (b) comprises the steps of:
(1) estimating an available processing bandwidth of the processor that is available to decrypt the encrypted data; and
(2) varying the encryption so that the processor uses no more than the available processing bandwidth during decryption of the encrypted data.

53. The apparatus of claim 52, wherein the estimating of step (b)(1) utilizes Markovian chains to model probable processing by the processor.

54. The apparatus of claim 52, wherein step (b)(2) comprises the step of halting the encryption if further encrypting would cause oversaturation of the processor during decryption of the encrypted data.

55. The apparatus of claim 50, wherein:
the data comprises a video picture; and
step (b) comprises encrypting a region of pixels having a variable size.

56. The apparatus of claim 50, wherein:
the data comprises a video picture having a plurality of blocks; and
step (b) comprises swapping pairs of the blocks.

* * * * *